United States Patent
Jin

(10) Patent No.: US 7,257,149 B2
(45) Date of Patent: Aug. 14, 2007

(54) OBTAINING INITIAL CODE SYNCHRONIZATION IN A CDMA COMMUNICATION SYSTEM

(75) Inventor: Min-Ho Jin, Kyongki-Do (KR)

(73) Assignee: LG Electronics Inc., Seoul (KR)

( * ) Notice: Subject to any disclaimer, the term of this patent is extended or adjusted under 35 U.S.C. 154(b) by 664 days.

(21) Appl. No.: 10/405,362

(22) Filed: Apr. 3, 2003

(65) Prior Publication Data

US 2003/0189971 A1    Oct. 9, 2003

(30) Foreign Application Priority Data

Apr. 4, 2002    (KR) .................... 10-2002-0018652

(51) Int. Cl.
*H04B 1/00*    (2006.01)
(52) U.S. Cl. ...................... 375/147; 375/150
(58) Field of Classification Search ................ 375/147, 375/150
See application file for complete search history.

(56) References Cited

U.S. PATENT DOCUMENTS

| | | | | |
|---|---|---|---|---|
| 5,022,049 A * | 6/1991 | Abrahamson et al. | ...... | 375/130 |
| 5,031,130 A * | 7/1991 | Harada | ...... | 708/250 |
| 5,081,644 A * | 1/1992 | Uchida et al. | ...... | 375/130 |
| 6,339,781 B1 * | 1/2002 | Sasaki | ...... | 708/252 |
| 7,016,694 B2 * | 3/2006 | Lee | ...... | 455/456.6 |
| 2002/0054623 A1 * | 5/2002 | Wang et al. | ...... | 375/148 |
| 2003/0161383 A1 * | 8/2003 | Mower et al. | ...... | 375/130 |
| 2003/0187576 A1 * | 10/2003 | Sanmiya et al. | ...... | 701/213 |

FOREIGN PATENT DOCUMENTS

| | | |
|---|---|---|
| CN | 1129268 | 11/2003 |
| JP | 09-055716 | 2/1997 |
| JP | 2000-209123 | 7/2000 |
| JP | 2001-244847 | 9/2001 |
| JP | 2001-345738 | 12/2001 |
| KR | 000074722 | 12/2000 |
| WO | WO 95/10903 | 4/1995 |
| WO | WO95/10903 | 4/1995 |

* cited by examiner

Primary Examiner—Jean B. Corrielus
Assistant Examiner—Nader Bolourchi
(74) Attorney, Agent, or Firm—Ked & Associates, LLP

(57) ABSTRACT

A code detector which may rapidly obtain initial code synchronization by generating different phases of a pseudo noise (PN) codes by a plurality of PN code generators. Also, the code detector implements multipliers in the code detector to perform simple and rapid multiplying operations of the output of the PN code generators.

32 Claims, 5 Drawing Sheets

OBTAINING INITIAL CODE SYNCHRONIZATION IN A CDMA COMMUNICATION SYSTEM

BACKGROUND OF THE INVENTION

1. Field of the Invention

Embodiments of present invention generally relate to communications.

2. Description of the Background Art

Mobile radio communication systems are used in everyday life. Garage door openers, remote controllers for home entertainment equipment, cordless telephones, hand-held walkie-talkies, pagers, and cellular telephones are all examples of mobile radio communication systems. For example, cellular radio systems provide high quality service that is often comparable to that of a landline telephone system.

Code Division Multiple Access (CDMA) is a type of cellular phone service. CDMA works by combining each phone call with a code which only one cellular phone uses. CDMA systems may offer up to 20 times more calling handling capacity than analog cellular systems by signing a special electronic code to each call signal. However, once a code is assigned to a call, it takes some time for that code to be usable to receive a signal. Once that code is usable, the code and the signal are synchronized. Often, the relatively long amount of time that it takes for the code to be synchronized with a signal is disruptive to the user. This disruption may be in the form of a delay in the initiation of a wireless telephone conversation or the inability to immediately access data over a wireless network.

SUMMARY OF THE INVENTION

Embodiments of the present invention relate to a method. The method may include adding at least two distinct demodulation codes (e.g., PN codes) and then multiplying a data signal by the sum of the distinct demodulation codes. The method then may determine from this product if at least one of the two demodulation codes corresponds (e.g., synchronized) to data embodied in the data signal. In other words, in embodiments of the present invention, because two codes are added together and then multiplied by a data signal, synchronization can be accomplished in roughly half the time. By adding two demodulation codes that are distinct from each other, both demodulation codes can be tested against a data signal at the same time to determine if one of the codes is aligned with the data signal. Accordingly, on average, the distinct demodulation codes can be synchronized more quickly, and there may be reduced delay in the initiation of a wireless telephone conversation.

DETAILED DESCRIPTION OF THE PREFERRED EMBODIMENTS

In Code Division Multiple Access (CDMA), obtaining synchronization of pseudo noise (PN) codes may include initial code synchronization and tracking code synchronization. Initial code synchronization may include receiving codes and generating codes locally in a ½ chip. Tracking code synchronization may perform fine code tracking to obtain accurate code synchronization on the basis of a coarse code synchronization obtained through the initial code synchronization.

In initial code synchronization, a receiver may determine where the code of a signal received is aligned in the time domain. When a code generated in the receiver is correlated with a received code, the correlative values may serve to distinguish codes having a correlative value higher than a critical value and codes having a correlative value lower than the critical value. A code having a correlative value higher than the critical value may serve as an indication that synchronization of the two codes was accomplished. Likewise, a code having a correlative value lower than the critical value may serve as an indication that synchronization of the two codes was not accomplished. Accordingly, if a code has a small correlative value, then a new code is generated and correlated with the received signal. This new code may be generated by delaying the phase of the code that had a low correlative value. This process is continually and repeatedly performed until initial code synchronization is achieved.

Figure 1:
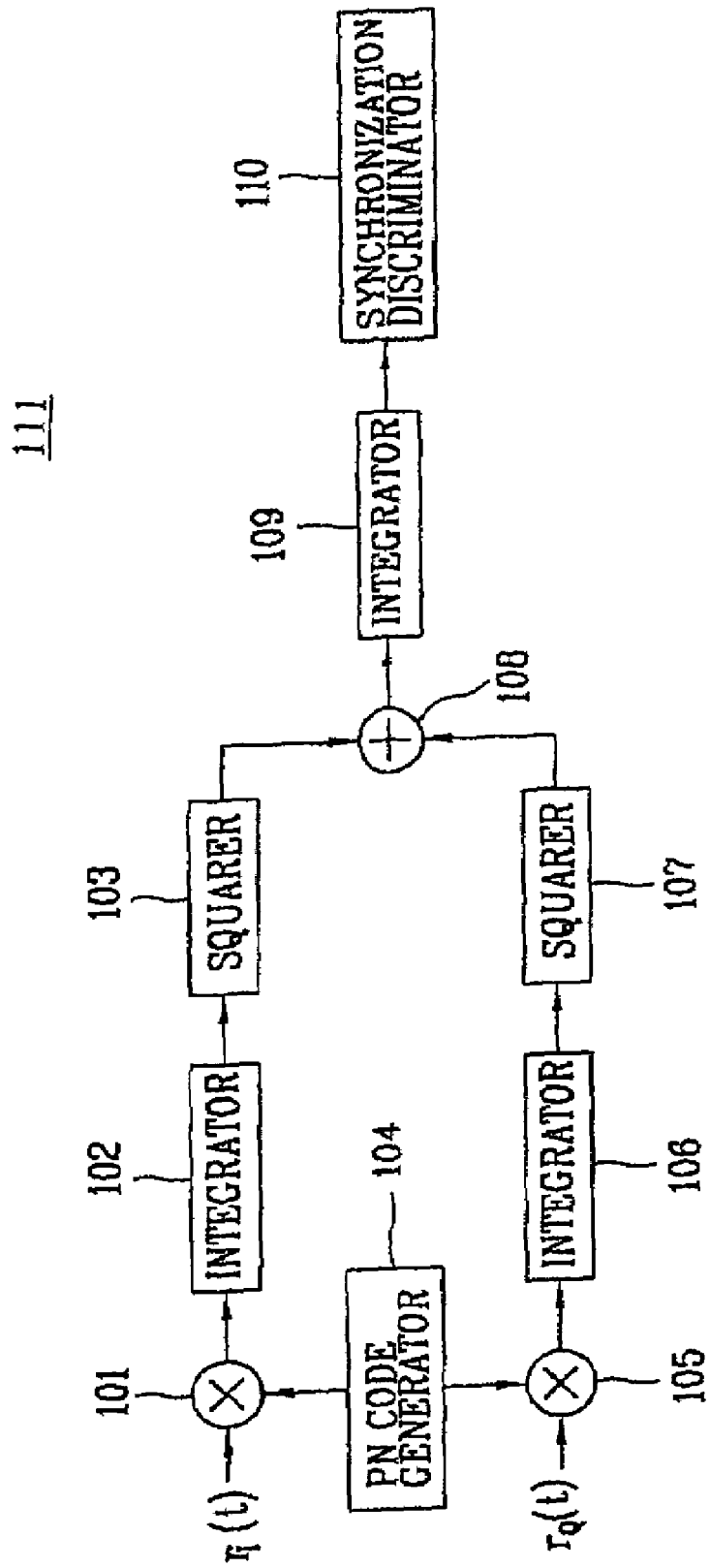
FIG. 1 is an exemplary block diagram illustrating a code detector with a BPSK method.

FIG. 1 is an exemplary block diagram illustrating code detection by a Binary Phase Shift Key (BPSK) method. Code detector 111 may include at least one of a PN code generator 104, a multiplier 101, an integrator 102, a squarer 103, a multiplier 105, an integrator 106, a squarer 107, an adder 108, an integrator 109, and a synchronization discriminator 110. PN code generator 104 may be for generating PN codes. Multiplier 101 may be for multiplying a signal of an I-channel and a code generated in PN codes generator 104. Integrator 102 may be for integrating the signal output from multiplier 101. Squarer 103 may be for obtaining an energy value of the signal output from integrator 102. Multiplier 105 may be for multiplying a signal of a Q-channel and a code generated in PN code generator 104. Integrator 106 may be for integrating the signal output from multiplier 105. Squarer 107 may be for obtaining the energy value of the signal output from integrator 106. Adder 108 may be for summing a signal output from squarer 103 and a signal output from squarer 107. Integrator 109 may be for integrating the signal output from adder 108. Synchronization discriminator 110 may be for determining whether initial code synchronization is obtained from the signal output from integrator 109.

In a code detector implementing a BPSK method, a signal output from integrator 102 may indicate a correlative energy of a code generated in the PN code generator 104 and a signal received from a I-channel. Likewise, a signal outputted from integrator 106 may indicate a correlative energy of a code generated in the PN code generator 104 and a signal received from a Q-channel. The correlative energies of the I-channel and Q-channel may be summed by adder 108. The sums are input into synchronization discriminator 110. Synchronization discriminator 110 may then compare a predetermined critical value and inputted correlative energy from integrator 109. If the inputted correlative energy is higher than the critical value, then initial code synchronization is concluded. However, if the energy is lower than the critical value, then initial code synchronization is repeated, changing the phase of the PN code generated in PN code generator 104.

Figure 2:
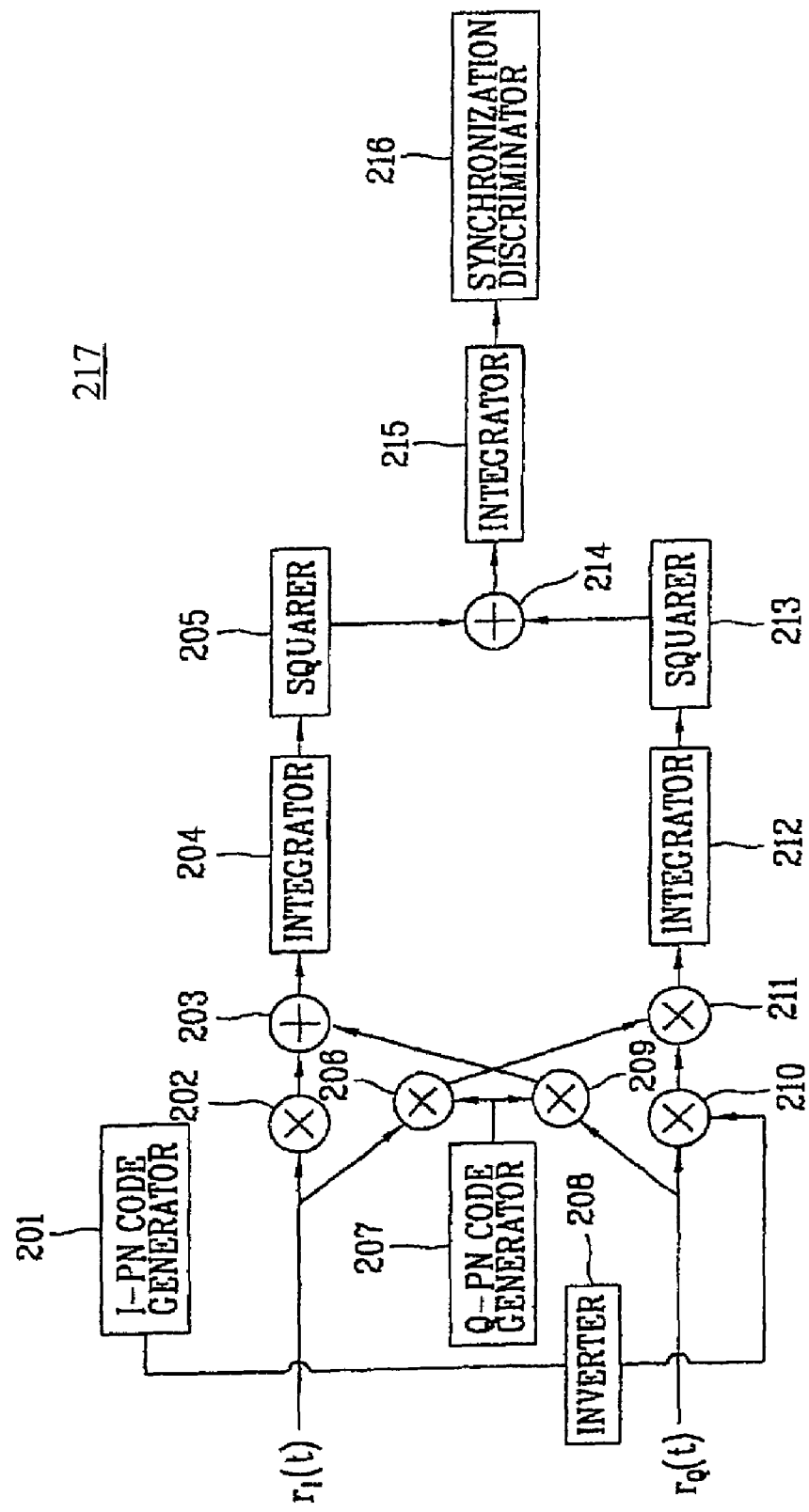
FIG. 2 is an exemplary block diagram illustrating a code detector with a QPSK method.

FIG. 2 is a block diagram illustrating a code detection by a Quaternary Phase Shift Keying (QPSK) method. Code detector 217 includes an I-PN code generator 201, a multiplier 202, an inverter 208, a multiplier 210, a Q-PN code generator 207, a multiplier 209, a multiplier 206, an adder 203, an adder 211, an integrator 204, a squarer 205, an integrator 212, a squarer 213, an adder 214, an integrator 215, and a synchronization discriminator 216. I-PN code generator 201 may be for generating an I-channel PN code. Multiplier 202 may be for multiplying a signal received from the I-channel and a code generated in I-PN code generator 201. Inverter 208 may be for inverting the I-PN code.

Multiplier 210 may be for multiplying the inverted I-PN code and a signal received in the Q-channel. Q-PN code generator 207 may be for generating a Q-channel PN code. Multiplier 209 may be for multiplying the signal received in the Q-channel and a code generated in the Q-PN code generator 207. Multiplier 206 may be for multiplying the code generated in the Q-PN code generator 207 and the signal received in the I-channel. Adder 203 may be for adding the signal multiplied in multiplier 209 and the signal multiplied in multiplier 202. Adder 211 may be for adding the signal multiplied in multiplier 206 and the signal multiplied in multiplier 210.

Integrator 204 may be for receiving the signal summed in adder 203 and integrating the result. Squarer 205 may be for obtaining an energy value of the integrated signal output from integrator 204. Integrator 212 may be for receiving the signal summed in adder 211 and integrating the result. Squarer 213 may be for obtaining an energy value of the integrated signal output from integrator 212. Adder 214 may be for adding the signal output from squarer 205 and the signal output from squarer 213. Integrator 215 may be for integrating the summed signals output from adder 214 for a predetermined period. Synchronization discriminator 216 may be for discriminating whether initial code synchronization was obtained from the integrated signal output from integrator 215.

Code detection implemented in a QPSK method may use I-channel PN code generator 201 and Q-channel PN code generator 207. Accordingly, an I-channel PN code and the signal received in the I-channel may be correlated, a Q-channel PN code and the signal received in the Q-channel may be correlated, and the two correlated signals may then be summed in adder 211. In a QPSK method, accomplishing initial code synchronization for the summed signals may be similar to the BPSK method with respect to adders 203 and 211. Code detectors illustrated in FIGS. 1 and 2 obtain the initial code synchronization by correlating the code generated in a PN code generator and a signal received for a predetermined period.

However, in the code detectors illustrated n FIGS. 1 and 2, if synchronization fails, local PN codes are delayed a predetermined phase and correlated again with the received signal. This process continues until synchronization is accomplished. One of ordinary skill in the art may appreciate the desire to minimize the amount of time for initial code synchronization. For example, minimizing the time for initial code synchronization may improve responsiveness and reliability of a wireless device.

Figure 3:
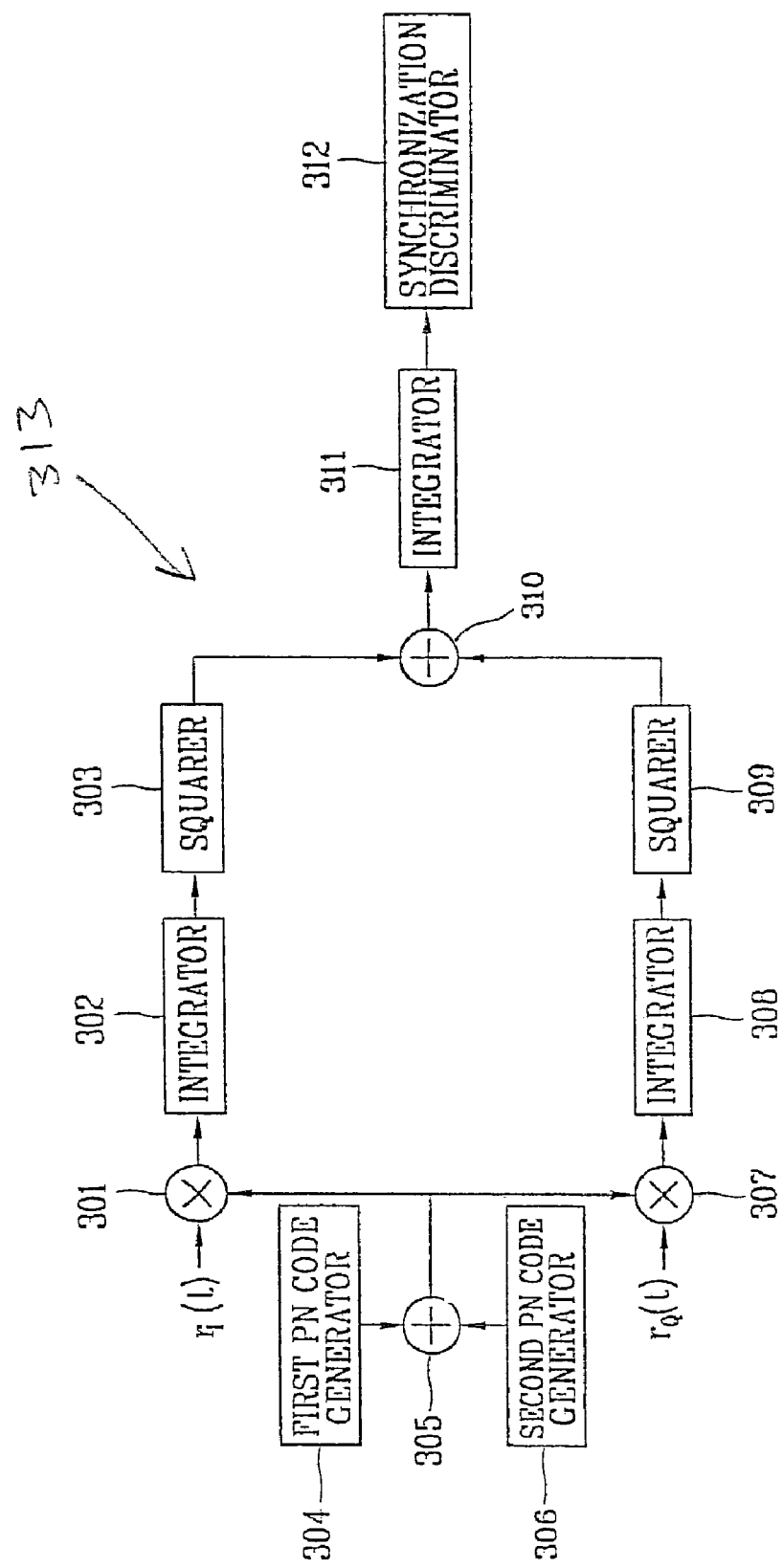
FIG. 3 is an exemplary block diagram illustrating a code detector with a BPSK method.

FIG. 3 is an exemplary block diagram illustrating a code detector implemented with a BPSK method in accordance with embodiments of the present invention. Code detector 313 may include at least one of first PN code generator 304, second PN generator 306, adder 305, multiplier 301, integrator 302, squarer 303, multiplier 307, integrator 308, squarer 309, adder 310, integrator 311, and a synchronization discriminator 312. First and second PN code generators 304 and 306 may be for generating PN codes. Adder 305 may be for summing PN codes which are generated in first and second PN code generators 304 and 306. Multiplier 301 may be for multiplying a signal received from an I-channel and the summed PN code. Integrator 302 may be for receiving the multiplied signal output from multiplier 301 and integrating the result. Squarer 303 may be for obtaining an energy value of the integrated signal.

Multiplier 307 may be for multiplying a signal received from a Q-channel and the summed PN code. Integrator 308 may be for receiving a signal multiplied in the multiplier and integrating the result. Squarer 309 may be for obtaining an energy value of the integrated signal output from integrator 308. Adder 310 may be for adding the signal outputted from squarer 303 and a signal outputted from squarer 309. Integrator 311 may be for integrating the added signal output from adder 310 for a predetermined period. Synchronization discriminator 312 may be for discriminating whether the initial synchronization was obtained from the integrated signal output from integrator 311.

First and second PN code generators 304 and 306 may generate different codes. For example, a PN code generated in the first PN code generator 304 and the PN code generated in the second PN code generator 306 may have a phase difference of ½ of 1 period. Accordingly, in embodiments, code detector 313 may operate twice as fast as the code detector illustrated in FIG. 1. Likewise, in other embodiments, initial code synchronization may be accomplished four times faster if four PN codes are generated with phase differences of ¼ period from four PN code generators.

The structure of multipliers 301 and 307 may be relatively simple and a multiplying operation may be performed rapidly by utilizing first and second PN code generators 304 and 306 to generate PN codes. When two PN codes are added, the resulting value may be limited to −2, 0, or +2. In embodiments, if the added value of two PN codes is 0, the output of multipliers 301 and 307 will be 0. In these embodiments, the resulting value may be outputted shifted-left if a sum of the two PN codes is +2. Further, in these embodiments, the resulting value is outputted shifted-left and 2's complemented if a sum of the two PN codes is −2. Accordingly, a multiplied result may be determined rapidly.

Figure 4:
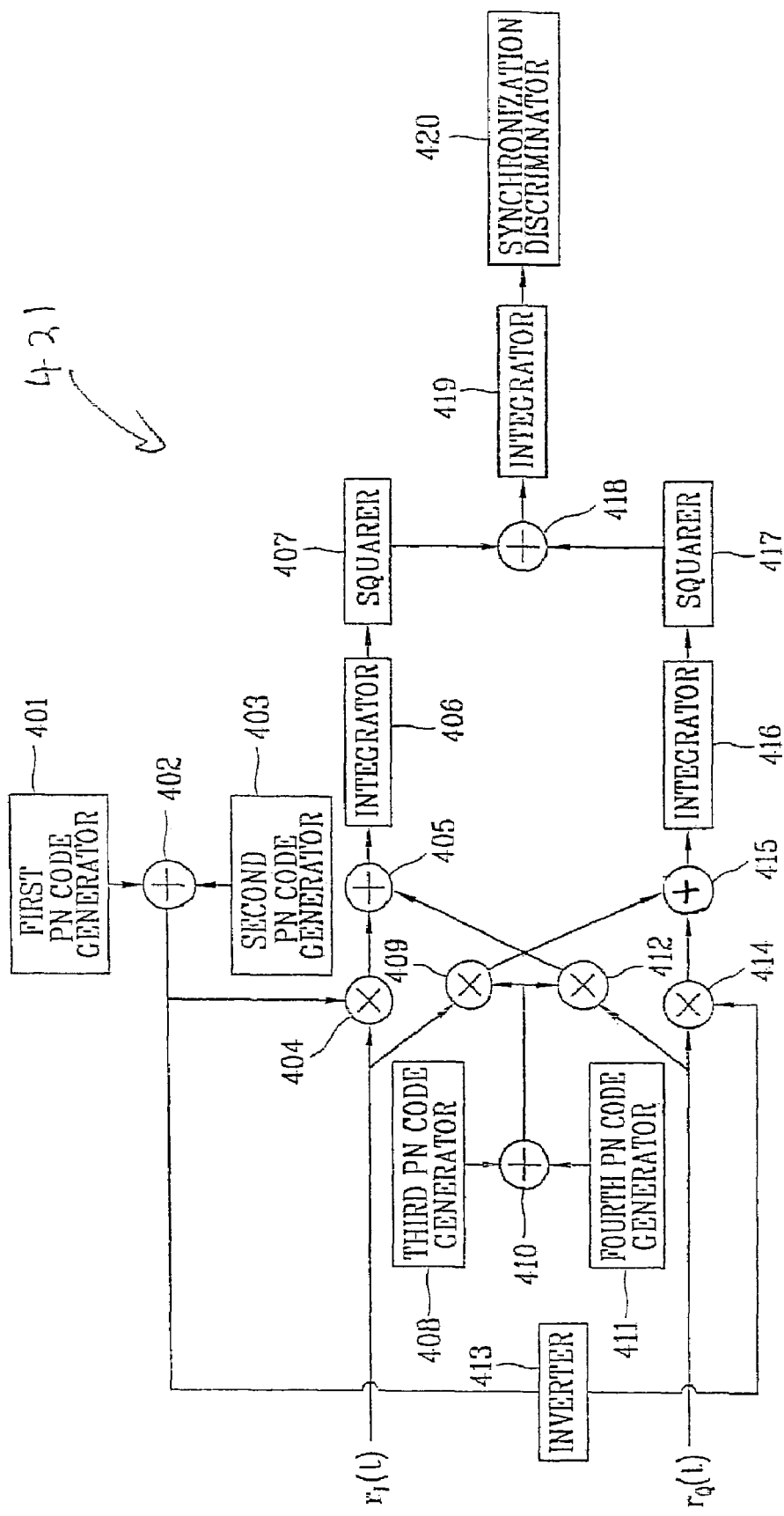
FIG. 4 is an exemplary block diagram illustrating a code detector with a QPSK method.

FIG. 4 is an exemplary block diagram illustrating a code detector implemented in a QPSK method. Code detector 421 include at least one of first PN code generator 401, second PN code generator 403, adder 402, multiplier 404, inverter 413, multiplier 414, third PN code generator 408, fourth PN code generator 411, adder 410, multiplier 409, multiplier 412, adder 405, adder 415, integrator 406, squarer 407, integrator 416, squarer 417, adder 418, integrator 419, and a synchronization discriminator 420. Adder 402 may be for summing an I-channel PN code generated respectively in first and second PN code generators 401 and 403. Multiplier 404 may be for multiplying a signal received in the I-channel by the PN code summed in the adder 402. Inverter 413 may be for inverting the summed PN code output from adder 402.

Multiplier 414 may be for multiplying the inverted PN code output from inverter 413 and the signal received in a Q-channel. Third PN code generator 408 and fourth PN code generator 411 may be for generating a Q-channel PN code. Adder 410 may be for summing the Q-channel PN codes generated in PN code generator 408 and PN code generator 411. Multiplier 409 may be for multiplying the summed PN code output from adder 410 and the signal received in the I-channel. Multiplier 412 may be for multiplying the summed PN code output from adder 410 and the signal received in the Q-channel. Adder 405 may be for summing the signal multiplied in multiplier 404 and the signal multiplied in multiplier 412. Adder 415 may be for summing the signal multiplied in multiplier 409 and the signal multiplied in multiplier 414.

Integrator 406 may be for receiving the signal summed in adder 405 and integrating the result. Squarer 407 may be for obtaining an energy value of the integrated signal output from integrator 406. Integrator 416 may be for receiving a signal summed in adder 415 and integrating the result. Squarer 417 may be for obtaining an energy value of the integrated signal output from integrator 416. Adder 418 may be for summing the signal output from squarer 407 and the signal output from squarer 417. Integrator 419 may be for integrating the summed signal output from adder 418 for a predetermined period. Synchronization discriminator 420 may be for discriminating whether initial code synchronization is discriminated from the integrated signal output from integrator 419.

A code detector in accordance with embodiments of the present invention may be implemented in a BPSK method. However, one of ordinary skill in the art can appreciate that aspects of the description of the code detector implemented in a BPSK method may apply to a QPSK method. Accordingly, although the following description of FIG. 5 references the BPSK method, it also applies to the QPSK method.

Figure 5:
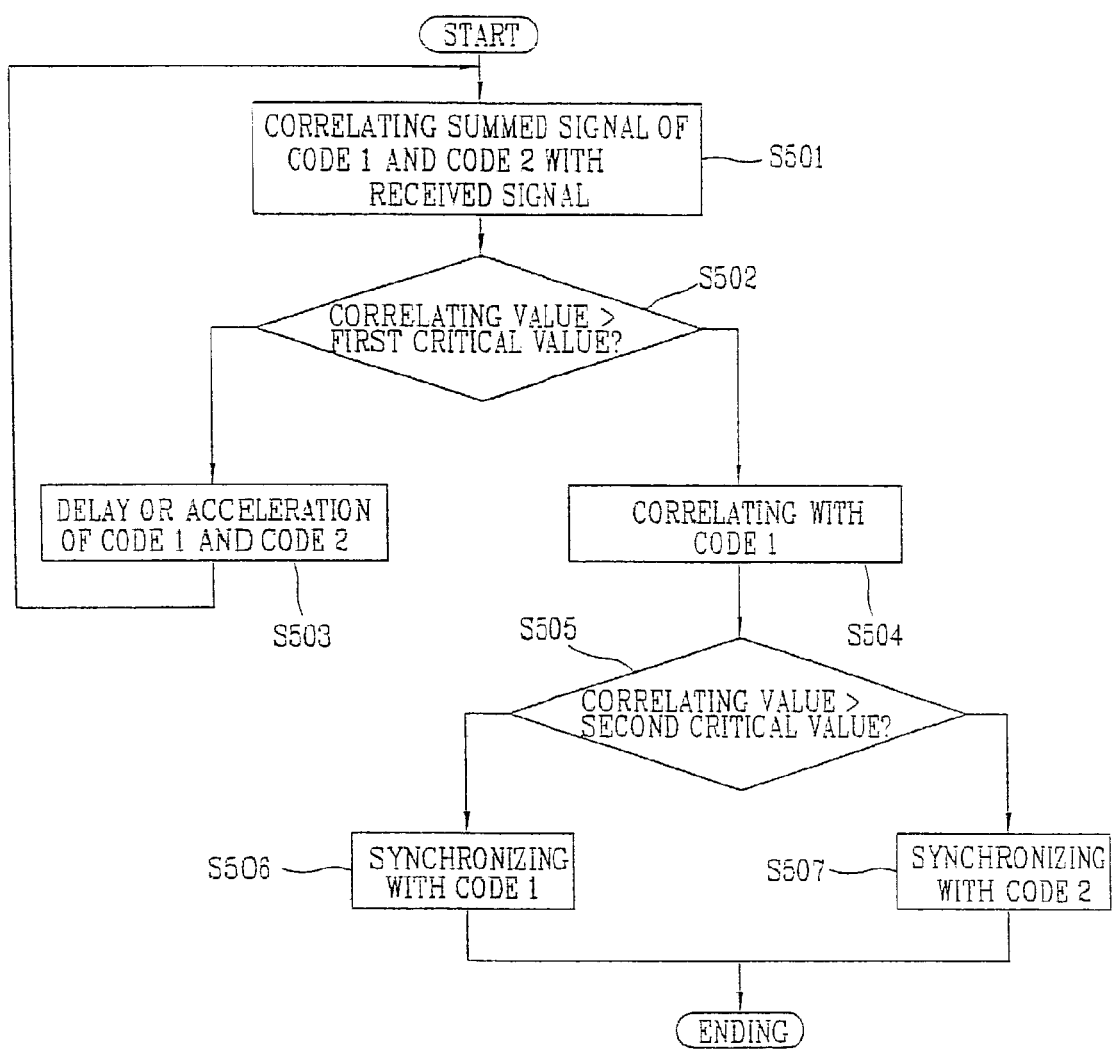
FIG. 5 is an exemplary flow chart illustrating a method for synchronizing a PN synchronization code.

FIG. 5 is an exemplary flow chart illustrating a method. PN codes generated in PN code generator 304 and PN code generator 306 are added in adder 305. A correlative energy of an I-channel signal and the added PN code may be determined over a predetermined period. Likewise, a correlative energy of a signal of a Q-channel and the added PN code may be determined over the predetermined period. The correlative energy determined for the I-channel and Q-channel may be added by adder 310 and input to synchronization discriminator 312 after being accumulated in integrator 311 (S501).

Synchronization discriminator 312 may compare a predetermined first critical value and the correlative energy output from integrator 311 (S502). If the inputted correlative energy is lower than the first critical value, the first and second PN code generators 304 and 306 delay or accelerate each PN code (S503). If the inputted correlative energy is higher than the first critical value, then the energy is correlated again with only the PN code generated in PN code generator 304 (S504). In other words, PN generator 304 generates a PN code identical to the previously generated PN code and PN code generator 304 generates a PN code with a '0' value.

A correlative energy is determined for a PN code generated in PN code generator 304 with the received signal and compared with a second critical value in the synchronization discriminator 312 (S505). If the correlative energy is higher than the second critical value, the synchronization discriminator 312 determines that the PN code generated in the first PN code generator 304 and the received signal are correlated with each other (S506). If the correlative energy is lower than the second critical value, the synchronization discriminator 312 determines that the PN code generated in the second PN code generator 306 and the received signal are correlated with each other (S507).

The code detector in accordance with embodiments of the present invention can rapidly obtain initial code synchronization by correlating the phase of the generated PN code with the received signal by using a plurality of PN code generators having different phases of the PN code. A code detector of embodiments of the present invention may implement multipliers to perform simple and rapid operations by using the plurality of PN code generators, thus to reduce power consumption and the area required for manufacturing.

An object of embodiments of the present invention is to provide an apparatus for rapidly obtaining initial code synchronization in a CDMA communication system by correlating PN codes with a received signal by using a plurality of different PN code generators. An object of embodiments of the present invention is for an apparatus to obtain initial code synchronization in a CDMA communication system and a method thereof, capable of reducing power consumption and the area of manufacturing by implementing multipliers used in the code detector to perform a simple and rapid operation by using a plurality of PN code generators.

Embodiments of the present invention relate to an apparatus for obtaining initial code synchronization in a CDMA communication system, including a code generator for generating a plurality of PN codes, adding the codes and outputting the result, a multiplier for multiplying the outputted code and received signal, an integrator for outputting a correlative value by accumulating the value outputted from the multiplier for a predetermined section, and a synchronization discriminator for comparing the value outputted from the integrator and a predetermined critical value.

Embodiments of the present invention relate to a method for obtaining initial code synchronization in a CDMA communication system that includes the steps of obtaining a received signal and correlative energy for a predetermined period by summing two PN codes, comparing the correlative energy and predetermined first critical value and searching which code is identical as synchronization between the two PN codes if the correlative energy is higher than the first critical value as the result of comparison.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method comprising:

adding at least two distinct demodulation codes to produce a sum;

correlating a data signal based on the sum to produce a product to generate a first correlative value;

determining that at least one of the two distinct demodulation codes corresponds to data embodied in the data signal based on the first correlative value;

correlating the data signal based on one of the two demodulation codes to generate a second correlative value; and determining that the other of the two demodulation codes corresponds to data embodied in the data signal based on the second correlative value.

2. The method of claim 1, wherein the at least two distinct demodulation codes are pseudo noise codes.

3. The method of claim 1, wherein the data signal includes data modulated by a code division multiple access method.

4. The method of claim 1, wherein at least two of the at least two distinct demodulation codes are the same code with different phases.

5. The method of claim 1, wherein the at least two distinct demodulation codes comprises two identical codes that are distinguishable by being out of phase by one half period.

6. The method of claim 1, wherein the at least two distinct demodulation codes comprises four identical codes that are distinguishable by each of the four codes being out of phase by one quarter period.

7. The method of claim 1, wherein determining that one of the two distinct demodulation codes corresponds to data embodied in the data signal comprises:
 comparing the first correlative value with a first predetermined threshold;
 determining that said one of the two distinct demodulation codes corresponds to data embodied in the data signal if the power level of the product is above the first predetermined threshold; and
 determining that said one of the two distinct demodulation codes does not correspond to data embodied in the data signal if the power level of the product is below the first predetermined threshold.

8. The method of claim 1, comprising determining which of the at least two distinct demodulation codes correspond to data embodied in the data signal, if it is determined from the first correlative value that at least one of the two distinct demodulation codes corresponds to data embodied in the data signal.

9. The method of claim 7, wherein determining that the other code corresponds to data embodied in the data signal comprises:
 (a) multiplying the other code by the data signal while excluding said one of the codes;
 (b) determining a power level of a product obtained in (a), the poxver level corresponding to the second correlative value;
 (c) comparing the power level to a second predetermined threshold;
 (d) determining that the other code corresponds to data embodied in the data signal, if the power level and the data signal is above the second predetermined threshold; and
 (e) determining that the other code does not correspond to data embodied in the data signal, if the power level is below the second predetermined threshold.

10. A CDMA communication system comprising an apparatus for obtaining initial code synchronization configured to implement the method of claim 1.

11. An apparatus for obtaining initial code synchronization in a CDMA communication system, comprising:
 a code generator configured to generate a plurality of pseudo noise (PN) codes, adding the codes, and outputting the result;
 a multiplier configured to multiply the outputted code and a received signal;
 an integrator configured to output a first correlative value by accumulating the values outputted from the multiplier for a predetermined period of time; and
 a synchronization discriminator configured to individually synchronize the received signal to each of the PN codes by:
 comparing a first predetermined value to the first correlative value generated based on a summed signal of at least first and second codes;
 determining that the received signal is correlated to the second code based on the comparison;
 comparing a second predetermined value to a second correlative value generated based on the first code but not based on the second code, and
 determining that the received signal is correlated to the first code based on the comparison of the second predetermined value to the second correlative value.

12. The apparatus of claim 11, wherein the code generator includes:
 a first PN code generator and a second PN code generator configured to generate PN codes; and
 an adder configured to add the PN codes which are generated in the first PN code generator and second PN code generator.

13. The apparatus of claim 12, wherein the PN codes generated in the first PN code generator and second PN code generator have a phase difference of predetermined period.

14. The apparatus of claim 12, wherein the PN codes generated in the first PN code generator and second PN code generator have a phase difference of ½ period.

15. The apparatus of claim 11, wherein the multiplier includes:
 a first multiplier configured to multiply the signal which is received in an I-channel and the PN code which is generated in the code generator; and
 a second multiplier configured to multiply the signal which is received in a Q-channel and the PN code which is generated in the code generator.

16. The apparatus of claim 15, wherein the first multiplier is configured to:
 output the signal received in the I-channel as a first value if a sum of the two PN codes corresponds to the first value;
 shift-left the signal received in the I-channel and outputs the signal shifted-left if a sum of the two PN codes is a second value; and
 shift-left and 2's-complement the signal received in the I-channel and outputs the signal shifted-left and 2's complemented if a sum of the two PN codes is a third value.

17. The apparatus of claim 15, wherein the second multiplier is configured to:
 output the signal received in the Q-channel as a first value if a sum of the txvo PN codes corresponds to the first value;
 shift-left the signal received in the Q-channel and outputs the signal shifted-left if a sum of the txvo PN codes is a second value; and
 shift-left and 2's-complement the signal received in the Q-channel and outputs the signal shifted-left and 2's complemented if a sum of the two PN codes is a third value.

18. The apparatus of claim 15, wherein the code generator includes:
 a first PN code generator and a second PN code generator configured to generate PN codes; and
 an adder configured to add PN codes which are generated in the first PN code generator and the second PN code generator.

19. The apparatus of claim 18, wherein a PN code generated in the first PN code generator and a PN code generated in the second PN code generator have a phase difference by a predetermined period.

20. The apparatus of claim 11, wherein the multiplier includes:
 a first multiplier configured to multiply the signal which is received in an I-channel and the PN code which is generated in an I-channel PN code generator;
 a second multiplier configured to multiply the signal which is received in a Q-channel and the PN code which is generated in a Q-channel PN code generator;
 a third multiplier configured to multiply the signal which is received in an I-channel and the PN code which is generated in the Q-channel PN code generator; and
 a fourth multiplier configured to invert and multiply the signal which is received in a Q-channel and the PN code which is generated in the I-channel PN code generator.

21. The apparatus of claim 20, wherein the first to fourth multipliers are configured to:
 output the signal as a first value if a sum of the two PN codes corresponds to the first value;
 shift-left the signal received and output the signal shifted-left if a sum of the two PN codes is a second value; and
 shift-left and 2's-complement the signal and output the signal shifted-left and 2's complemented if a sum of the two PN codes is a third value.

22. The apparatus of claim 20, wherein:
 the I-channel PN code generator includes:
 a first PN code generator and a second PN code generator each configured to generate PN codes;
 a first adder configured to add PN codes which are generated in the first PN code generator and the second PN code generator, and
 the Q-channel PN code generator includes:
 a third PN code generator and a fourth PN code generator configured to respectively generate PN codes; and
 a second adder configured to sum the PN codes which are generated in the third PN code generator and the fourth PN code generator.

23. The apparatus of claim 22, wherein the respective PN codes generated in the first and second code generators have a phase difference of a predetermined period.

24. The apparatus of claim 22, wherein the respective PN codes generated in the third and fourth code generators have a phase difference of a predetermined periods.

25. The apparatus of claim 11, wherein if the first correlative value is in a first predetermined range relative to the first predetermined value, then the synchronization discriminator:
 modifies at least one of the first and second codes;
 generates a third correlative value based on the modified first and second codes;
 compares the first predetermined value to the third correlative value; and
 determines that the received signal is correlated to the modified second code based on the comparison of the first predetermined value to the third correlative value.

26. The apparatus of claim 25, wherein if the first correlative value is in the first predetermined range, the synchronization discriminator determines that the received signal is not correlated to either of the first and second codes.

27. The apparatus of claim 26, wherein if the second correlative value is in a second predetermined range relative to the second predetermined value, then the synchronization discriminator:
 modifies the first code;
 generates a fourth correlative value based on the modified first code but not based on the second code;
 compares the second predetermined value to the fourth correlative value; and
 determines that the received signal is correlated to the modified first code based on the comparison of the second predetermined value to the fourth correlative value.

28. The apparatus of claim 27, wherein if the second correlative value is in the second predetermined range, the synchronization discriminator determines that the received signal is not correlated to the first code.

29. A method for obtaining initial code synchronization in a CDMA communication system, comprising:
 obtaining a received signal and correlative energy for a predetermined period by adding two pseudo noise (PN) codes;
 comparing the correlative energy and a predetermined first critical value; and
 searching which one of the two codes is synchronized with the received signal if the correlative energy is higher than the first critical value as a result of the comparing.

30. The method of claim 29, wherein the phases of the two PN codes are respectively delayed or accelerated if the correlative energy is lower than the first critical value as the result of the comparing.

31. The method of claim 29, further comprising:
 (a) correlating the other code with the received signal;
 (b) obtaining a correlative energy from (a);
 (c) comparing the correlative energy in (b) to a predetermined second critical value; and
 (d) determining that the other code is synchronized with the received signal if the correlative energy in (b) is higher than the second critical value.

32. A method for obtaining initial code synchronization in a CDMA communication system, comprising:
 determining a correlative energy for the product of a received signal and a sum of at least two pseudo noise (PN) codes;
 comparing the correlative energy and a predetermined first critical value;
 delaying or acclerating phases of two PN codes, if the correlative energy is lower than the first critical value; and
 determining which code of the two PN codes is synchronized with the received signal, if the correlative energy is higher than the first critical value.

* * * * *